United States Patent
Pegrum et al.

(10) Patent No.: US 6,490,244 B1
(45) Date of Patent: Dec. 3, 2002

(54) LAYER 3 ROUTING IN SELF-HEALING NETWORKS

(75) Inventors: Scott Pegrum, Nepean (CA); Matthew Yuen, Ottawa (CA); Alicja Celer, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/522,096

(22) Filed: Mar. 9, 2000

(51) Int. Cl.[7] .................. G01R 31/08; G06F 15/173; H04B 1/74
(52) U.S. Cl. .................. 370/216; 370/238; 370/258; 714/4; 709/242
(58) Field of Search ............... 370/216, 222, 370/223, 224–225, 227–228, 238, 258, 241, 243–244, 403–405; 714/1–2, 4; 709/239, 241, 251, 238, 242

(56) References Cited

U.S. PATENT DOCUMENTS

| | | | |
|---|---|---|---|
| 5,262,906 A | 11/1993 | Mazzola | 370/254 |
| 5,546,542 A | 8/1996 | Cosares et al. | 709/241 |
| 5,706,276 A | 1/1998 | Arslan et al. | 370/216 |
| 5,923,646 A | 7/1999 | Mandhyan | 370/254 |
| 6,295,275 B1 * | 9/2001 | Croslin | 370/216 |

OTHER PUBLICATIONS

Katz et al., "SDH Management Network: Architecture, Routing and Addressing," Telecommunications Conference (Globecom), New York, IEEE, vol. 1, pp. 223–228, Nov. 29, 1993.

Ambrosoli et al., "TMN Architecture for SDH Networks using IS–IS Routing Protocol: Design and Performances," Proceedings of International Conference on Communication Technology, vol. 1, pp. 223–227, May 5, 1996.

* cited by examiner

Primary Examiner—Wellington Chin
Assistant Examiner—Maikhanh Tran
(74) Attorney, Agent, or Firm—Bromberg & Sunstein LLP

(57) ABSTRACT

Upper layer 3 routing in conjunction with self-healing lower layer networks is more informed by the addition of reachability costs determined in the lower layer. Maintenance changes on the self-healing network are monitored. A change causes revision of reachability costs. The revised costs are communicated by lower layer logic to upper layer logic.

26 Claims, 2 Drawing Sheets

LAYER 3 ROUTING IN SELF-HEALING NETWORKS

BACKGROUND OF THE INVENTION

The present invention relates to layer 3 routing in conjunction with operation over self-healing networks. A self-healing network as defined herein is a lower layer routing protocol which can hide a broken link in the network from the upper layers, routing the communication without interruption.

When used in conjunction with conventional networks, a layer 3 routing entity tends to determine the least costly path between any two layer 3 routing entities in the network according to a routing protocol, such as RIP, OSPF (RFC 2328). Layer 3 routing entities are connected to one another by a link. There are many examples of links, but a frame relay DLCI, ATM VCC, Ethernet LAN are but a few. Layer 3 routing entities maintain knowledge of their immediate neighbors to whom they are linked. Point-topoint links (such as a frame relay DLCI) will always set up routing adjacencies. While broadcast links (such as Ethernet) may or may not set up routing adjacencies, they will always set up neighbor adjacencies. (Neighbors are a subset of routing adjacencies.) When a point-to-point link fails, the routing entities readjust their adjacency lists. Routing adjacencies to entities that are not neighbors may need to be recomputed to get around the failed link. When the link is reestablished, the routing entities must perform a complex sequence of handshaking to set up routing adjacency again. This process is compute and bandwidth intensive.

Self-healing networks such as SONET rings hide most of the link failures from the routing entities. This is performed, in the case of SONET rings, by sending the traffic between the two routing entities around the ring in the opposite direction. Activity between the routing entities is thereby maintained and a broken link is not seen. In particular, a link flap in which a link is repeatedly opened and closed is hidden from the upper layer routing logic. The costly recomputation and resynchronization of the layer 3 routing entities is thereby avoided. However, this may lead to inefficient transport of data because the broken link is hidden from the layer 3 router. A break in the SONET ring between two routing entities that are relatively close will result in data traffic between the two entities being sent around the long side of the ring. If those two entities were joined by a second route, it may have been possible to redirect traffic through the second route instead of taking the long path around the first SONET ring. However, the layer 3 router is unaware of the break in the SONET ring and takes the long path around the first ring instead of the shorter path on the second route.

SUMMARY OF THE INVENTION

In accordance with embodiments of the present invention, reachability costs are determined by a self-healing lower layer network and communicated to upper layer routing logic. Maintenance changes in the self-healing network are monitored. Thus, when a break in a link is recognized. When a maintenance change occurs, reachability costs are revised. The reachability costs provide a relative measure of the burden in getting from one point to another on the self-healing network. The revised cost data is communicated to the upper layer logic. In an embodiment of the invention, reachability costs can be a measure of the number of routers which are traversed from one point to another through the active portions of the ring. Program code for performing the method of an embodiment of the invention may be incorporated into add drop multiplexor functionality for use on a self-healing network.

A self-healing lower layer network of an embodiment of the invention connects a plurality of routers in a ring configuration. Reachability costs are determined by messages sent over the self-healing lower layer network that contain an originator identifier and a node counter data field. The node counter date field is changed by one increment at each router through which the message passes. By reading the originator identifier and node counter data field at each router, each router learns the number of routers between the originator and itself. This number is used to determine the reachability cost. The cost is recorded. A least cost reachability cost for a route is communicated by lower layer logic to upper layer logic. A maintenance change due to a link failure may result in revising the least cost reachability cost by replacing a cost for routing in one direction about the ring with a cost for running in an opposite direction about the ring with a cost for running in an opposite direction about the ring.

In accordance with the method of embodiments of the invention, lower overall network utilization can be achieved. Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
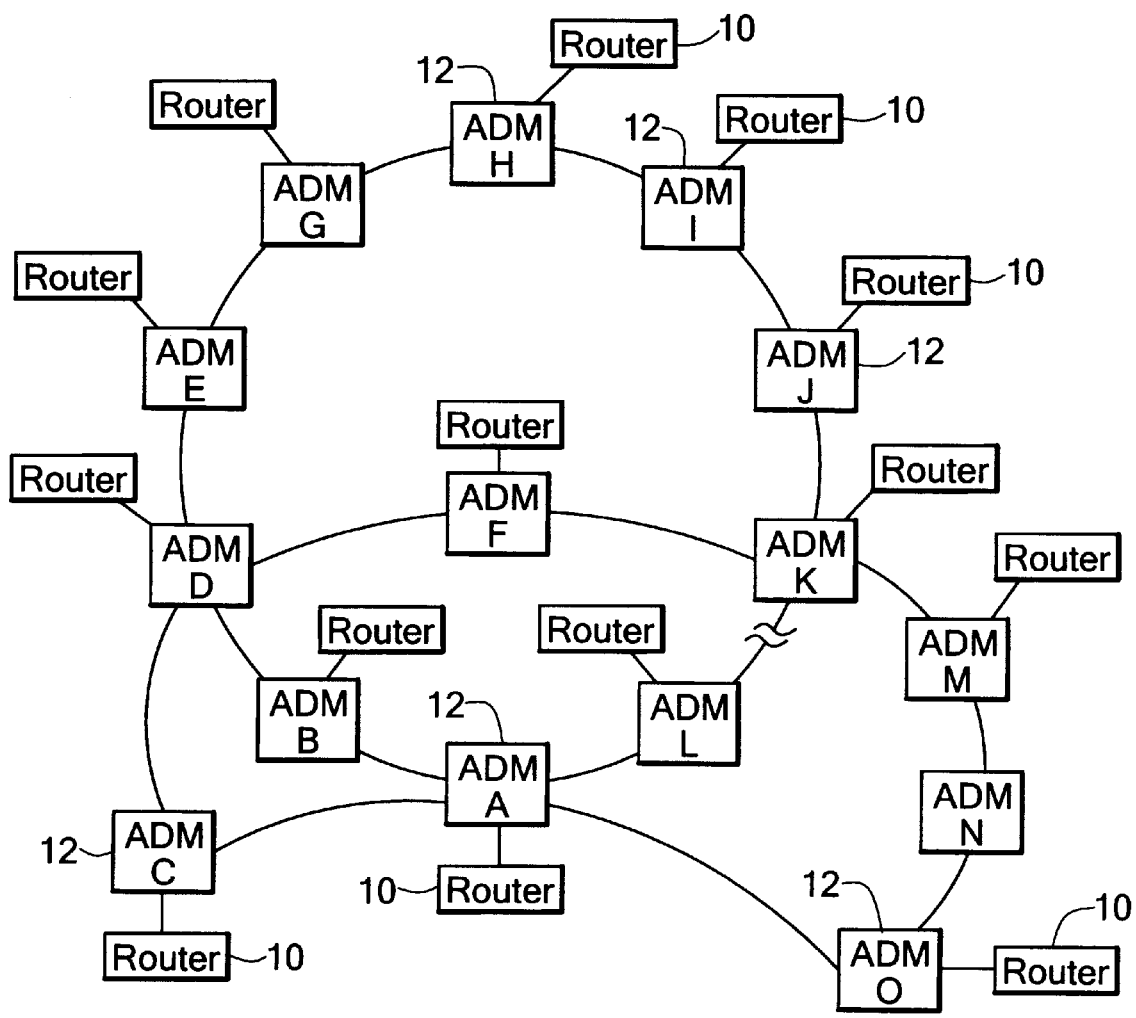
FIG. 1 is a schematic block diagram of a routing network which may take advantage of the present invention.

A network as shown in FIG. 1 is comprised of a number of point-to-point links. A link connects two layer 3 routing entities. Layer 3 routing and above are considered herein as upper layer routing. Each layer 3 routing entity includes a router 10. The router is interfaced with the data network through lower layer routing logic. For SONET rings, the lower layer logic is found in an add drop multiplexor ("ADM") 12. For Multi Protocol Label Switching (MPLS), the logic is included in a label edge router. For any self-healing lower layer network, the lower layer routing entity may be included in a box that also contains the associated router. Alternatively, a separate add drop multiplexor box or label edge router may be in communication over a communication link with a separate router box.

A self-healing lower layer network is shown including ADM's A, B, D, E, G, H, I, J, K, L in FIG. 1. Self-healing networks operate under any of a number of layer 3 routing protocols, such as OSPF, RFC 2328 or RIP. The lower layer protocols of typical self-healing networks include SONET rings, Virtual Network Switching ("VNS") and a variety of types of Multi-Protocol Label Switching (MPLS). With conventional self-healing networks like VNS or SONET, all neighbors appear to be reachable at the same cost. In conventional networks, two layer 3 routers, Boston and Los Angeles, connected using VNS or SONET appear to have the same cost of communication as two other routers, New York and Philadelphia. This is grossly inaccurate because the cost of communication between Boston and Los Angeles is much greater than the cost between the much closer cities New York and Philadelphia. When a router has a choice of routes, this can lead to inefficient routing. Another impact on the efficiency of routing occurs when there is a link failure in a self-healing network. Conventionally, the self-healing network hides the fact that a link failure has occurred, curing the failure itself by rerouting data traffic. For example, if we assume that the ring of ADM's A, L, K, J, I, H, G, E, D, B normally handles traffic in a counterclockwise direction, if there is a failure between L and K, data from A intended for K will be rerouted clockwise about the ring. This will result in a much longer data path. But in conventional systems, the router at A would be unaware of the increased reachability cost of getting from A to K as a result of the link failure. Where that router has an alternate network available for getting to K, for example, A, O, N, M, K, the router under conventional self-healing network technology would fail to recognize this alternate route as the more efficient route after the link failure.

Figure 2:
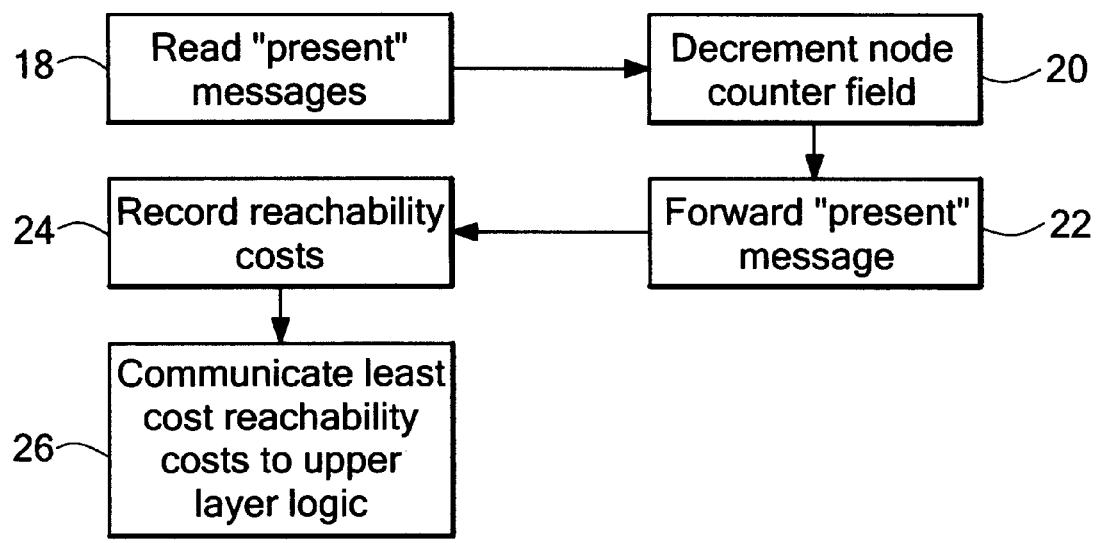
FIG. 2 is a flow chart of a method for implementing an embodiment of the present invention.

In accordance with an embodiment of the invention, a process to determine and maintain reachability costs on a self-healing lower layer network may be implemented as program code in lower layer logic at a routing node. Referring now to FIG. 2, a method is illustrated for determining reachability costs in lower layer logic on a self-healing network. In accordance with the present invention, reachability costs can include any factors that are important to the network operator in selecting a preferred rate, including available bandwidth, physical distance, number of intermediate hops on the self-healing network, etc. A simple method of determining one type of reachability cost (i.e., physical distance) is to count the number of repeaters from one routing entity to the other along the self-healing network. FIG. 2 provides an example of such a method. Discovery of a self-healing lower layer network topology occurs by the lower layer logic in each routing node sending neighbor discovery messages onto the network. In a ring configuration, messages are sent out each of the opposite ports, referred to as the east and west ports for convenience herein. The discovery messages are sent on the lower layer network's maintenance channel. Once a routing node receives a neighbor discovery message, its lower layer logic then periodically broadcasts an "I am present" message in both directions. The message may be sent out every 500 ms. for example. The message includes a node counter field and an originator ID. At each routing node along the ring, the "I am present" message are read 18. Each node receiving the message changes the node counter field by one increment 20 and forwards the message to the next node 22. In accordance with a presently preferred embodiment, the "I am present" message is originated with a node counter field set at 255 and each node, in turn, decrements the counter by one.

As the present messages are read, the receiving node learns the distance in terms of routing node count between it and the originator from the value of the node counter field. This information is used to give a reachability cost for the originator on the self healing lower layer network. The reachability cost is recorded 24 by the lower layer logic. Two reachability costs are obtained on a ring network for each originator, one for east going messages and one for west going messages. The least cost of the two is communicated up to the upper layer logic for use in computing point-to-point links costs.

Figure 3:
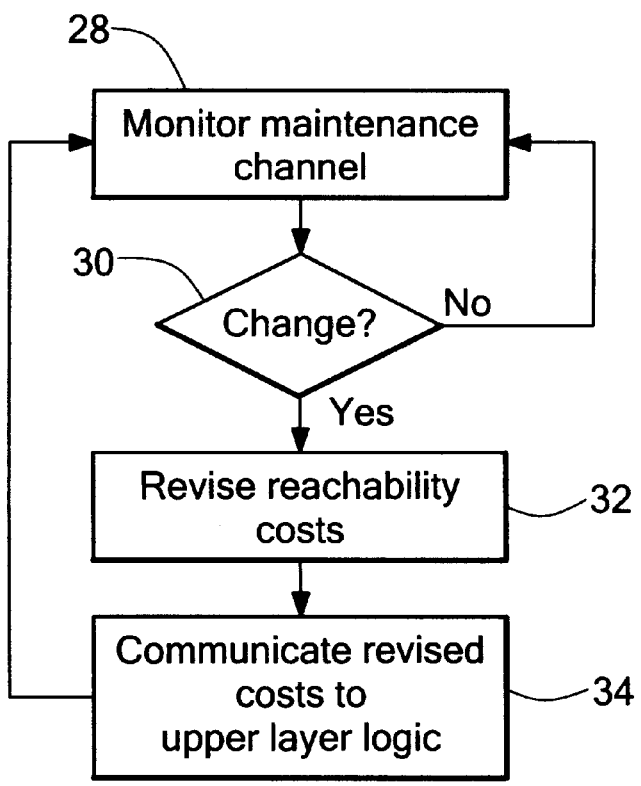
FIG. 3 is a flow chart of a method for dynamically maintaining reachability costs in accordance with an embodiment of the present invention.

Conventional lower layer logic monitors the status of each link and causes traffic to be rerouted upon detection of a link failure. In accordance with embodiments of the present invention, reachability costs are dynamically maintained in response to the status of the links as shown in FIG. 3. The maintenance channel is monitored 28 to detect link failures. If there is a status change 30, the reachability costs are revised 32. If a routing node cannot be reached along the shorter portion of the ring, the least cost reachability cost becomes the cost for the longer portion of the ring. Thus, the least cost reachability cost is replaced by the cost for routing in an opposite direction about the ring. The revised least cost reachability cost is communicated to the upper layer logic 34. The self-healing lower layer network still behaves by hiding the fact of a link failure from the upper layer logic, but succeeds in educating the upper layer by revising the reachability costs. To avoid interference with data traffic between the router and ADM, the reachability costs may preferably be sent on an out-of-band channel. The upper layer logic is then in a position to make a more efficient choice of routes for data traffic. In the case of FIG. 1, the router at ADM A when sending data to K will be informed of the increased cost that would show up between A and K when such a link failure occurs. The router may then determine that the more efficient network would be to send data from A to O, N, M, K. This would advantageously reduce overall network utilization.

There are numerous factors that the upper layer logic may choose to take into account when determining relative costs of available routes from one routing node to another. In accordance with embodiments of the invention, a preferred route is selected in upper layer logic in view of calculations for each of the available routes wherein routes over a self-healing lower layer network are evaluated using reachability cost data obtained from lower layer logic. For example, the cost of a route can be calculated and a cost value assigned to the route for layer 3 routing as follows:

Route cost=# of Hops (indicated by reachability cost)*Magic number+Sonet Interface preference In this calculation, the reachability cost for the lower layer logic is multiplied by a "magic number." The "magic number" would be a constant used by the system operator to weigh the relative importance of the number of hops on a Sonet ring as compared with cost data available for other available routes on other types of lower layer networks. The Sonet Interface preference is a number also used to weigh the system's relative preference for one type of lower layer network over another. Calculation for available routes are compared and the preferred route is selected on the basis of the calculations.

Alternative embodiments of the invention may be implemented as a computer program product for use in lower layer logic on an add drop multiplexor label edge router or other data network interface. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Of course, it should be understood that various changes and modifications to the preferred embodiments described above will be apparent to those skilled in the art. The factors used to determine a reachability cost may vary significantly from one system to another. The manner in which an upper layer logic uses the reachability costs to select a preferred route will also vary from one system to another. These and other variations can be made without departing from the spirit and scope of the invention and without diminishing its attendant advantages. It is, therefore, intended that such changes and modifications be covered by the following claims.

We claim:

1. A method for enhanced upper layer routing in connection with a self-healing lower layer network comprising:
   monitoring maintenance changes on the self-healing lower layer network;
   revising in lower layer logic a table of reachability costs for getting from one point to another on the self-healing network in response to a maintenance change; and
   providing revised cost data to upper layer logic.

2. The method of claim 1 further comprising calculating, in the upper layer logic, a preferred route using cost data obtained from the lower layer logic.

3. The method of claim 1 wherein the self-healing lower layer network is a ring configuration of routing nodes and wherein said act of revising comprises replacing a cost for routing in one direction about the ring with a cost for routing in an opposite direction about the ring.

4. The method of claim 1 wherein the maintenance change comprises a link failure.

5. A method for informed upper layer routing in connection with a self-healing lower layer network comprising:
   determining, in lower layer logic, reachability costs for getting from one routing node to other routing nodes on the self-healing network; and
   providing the reachability costs to upper layer logic.

6. The method of claim 5 further comprising calculating, in the upper layer logic, a relative cost for a route on the self-healing lower layer network using the reachability costs.

7. The method of claim 6 further comprising selecting a preferred route from one routing node to another by comparing the calculations of relative costs for a plurality of available routes.

8. The method of claim 6 wherein calculating in the upper layer logic comprises multiplying a reachability cost by a preference number.

9. The method of claim 5 wherein determining comprises transmitting a message on the self-healing network from a first routing node to a second routing node, said message being changed at each node along the way to the second routing node to produce a reachability cost between the first router and the second routing node.

10. The method of claim 5 further comprising:
    monitoring maintenance changes on the self-healing lower layer network;
    revising in lower layer logic the reachability cost of getting from one routing node to another on the self-healing network in response to a maintenance change; and
    providing revised cost data to the upper layer logic.

11. The method of claim 5 wherein the upper layer logic comprises layer 3 routing logic.

12. A computer program product for use in routing logic of a self-healing lower layer network comprising:
    program code for monitoring maintenance changes on the self-healing lower layer network;
    program code, responsive to a maintenance change, for revising reachability costs for getting from one point to other points on the self-healing network; and
    program code for sending the revised reachability costs to upper layer logic.

13. The computer program product of claim 12 further comprising program code for determining reachability costs between one point and another on the self-healing network.

14. The computer program product of claim 13 wherein said program code for determining comprises reading a node count from a message sent from one node to the node on which said program code is running.

15. The computer program product of claim 12 wherein the self-healing lower layer network is a ring configuration of routing nodes and wherein said program code for revising comprises program code for replacing a cost for routing in one direction about the ring with a cost for routing in an opposite direction about the ring.

16. An add drop multiplexor for use on a self-healing lower layer network comprising:
    data storage for a plurality of reachability costs for getting from the add drop multiplexor to other points on the self-healing lower layer network;
    program code for monitoring maintenance changes on the self-healing lower layer network;
    program code, responsive to a maintenance change, for revising one or more of the reachability costs; and
    program code for sending the revised reachability costs to upper layer logic.

17. The add drop multiplexor of claim 16 further comprising program code for determining reachability costs between the add drop multiplexor and another on the self-healing lower layer network.

18. The add drop multiplexor of claim 17 wherein said program code for determining comprises reading a node count on a message received from another add drop multiplexor on the self-healing lower layer network.

19. The add drop multiplexor of claim 16 wherein the self-healing lower layer network is a ring configuration and wherein said program code for revising comprises program code for replacing a cost for routing in one direction about the ring with a cost for routing in an opposite direction about the ring.

20. On a self-healing lower layer network connecting a plurality of routing nodes in a ring each having lower layer logic for routing over the self-healing lower layer and upper layer logic, the method comprising:
    sending a message over the self-healing lower layer network with a node counter data field and an originator identifier;
    changing the node counter data field by one increment at each routing node through which the message passes;

reading the node counter data field and originator identifier at each routing node;

recording a reachability cost determined by the node counter data field for the originator in the originator identifier; and communicating a least cost reachability cost for the originator from the lower layer logic of a routing node to the upper layer logic of the routing node.

21. The method of claim 20 further comprising monitoring maintenance changes on the self-healing lower layer network, revising the least cost reachability cost in response to a maintenance change, and communicating the revised least cost reachability cost to upper layer logic.

22. The method of claim 21 wherein revising comprises replacing a cost for routing in one direction about the ring with a cost for routing in an opposite direction about the ring.

23. A communication system including a plurality of routing nodes interconnected over a self-healing lower layer network, each routing node having lower layer logic and upper layer logic, said system comprising in at least one of said routing nodes:

program code for determining in lower layer logic reachability costs for getting to other routing nodes in said self-healing lower layer network; and program code for communicating the reachability costs from the lower layer logic to the upper layer logic.

24. The communication system of claim 23 wherein the lower layer logic in each of said routing nodes comprises means for sending a "present" message over the self-healing lower layer network with a node counter data field and an originator identifier and means for changing the node counter data field of each received "present" message by one increment before passing the "present" message along the self-healing lower layer network.

25. The communication system of claim 23 wherein the lower layer logic in at least one of said routing nodes comprises:

program code for monitoring link failures on the self-healing lower layer network;

program code, responsive to a link failure, for revising reachability costs for getting to other routing nodes on the self-healing network; and program code for sending the revised reachability costs to upper layer logic.

26. The communication system of claim 25 wherein the plurality of routing nodes are arranged in a ring configuration on the self-healing lower layer network and wherein said program code for revising reachability costs comprises program code for replacing a cost for routing in one direction about the ring with a cost for routing in an opposite direction about the ring.

* * * * *